United States Patent
Kauria et al.

(10) Patent No.: US 6,292,670 B1
(45) Date of Patent: *Sep. 18, 2001

(54) MAINTAINING A GROUP CALL IN A MOBILE COMMUNICATIONS SYSTEM

(75) Inventors: Sirpa Kauria; Christina Lassfolk, both of Espoo (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,561
(22) PCT Filed: Dec. 27, 1995
(86) PCT No.: PCT/FI95/00710
    § 371 Date: Jun. 30, 1997
    § 102(e) Date: Jun. 30, 1997
(87) PCT Pub. No.: WO96/20573
    PCT Pub. Date: Jul. 4, 1996

(30) Foreign Application Priority Data

Dec. 28, 1994 (FI) ..................... 946142

(51) Int. Cl.$^7$ ..................... H04B 7/00
(52) U.S. Cl. ..................... 455/518; 455/509
(58) Field of Search ..................... 455/422, 426, 455/432, 435, 436, 438, 439, 450, 455, 458, 459, 516, 517, 518, 519, 520, 524, 525, 509

(56) References Cited

U.S. PATENT DOCUMENTS

| | | | |
|---|---|---|---|
| 4,658,435 | * | 4/1987 | Childress et al. ............... 455/54 |
| 4,833,701 | * | 5/1989 | Comroe et al. ............... 455/33 |
| 4,926,495 | * | 5/1990 | Comroe et al. ............... 455/54 |
| 5,054,110 | * | 10/1991 | Comroe et al. ............... 455/520 |
| 5,179,721 | * | 1/1993 | Comroe et al. ............... 455/426 |
| 5,193,101 | * | 3/1993 | McDonald et al. ............... 455/426 |
| 5,218,716 | * | 6/1993 | Comroe et al. ............... 455/33.4 |
| 5,369,781 | * | 11/1994 | Comroe et al. ............... 455/15 |
| 5,371,898 | * | 12/1994 | Grube et al. ............... 455/33.1 |
| 5,387,905 | * | 2/1995 | Grube et al. ............... 455/56.1 |

FOREIGN PATENT DOCUMENTS 2 225 196   5/1990  (GB).
2 264 210   8/1993  (GB).

* cited by examiner

Primary Examiner—Nguyen Vo
Assistant Examiner—Sam Bhattacharya
(74) Attorney, Agent, or Firm—Pillsbury Madison & Sutro LLP

(57) ABSTRACT

In a method for maintaining a group call in a mobile communication system, a mobile station is registered to a first base station and starts a group call. A traffic channel is reserved by the first base station for the group call, and the mobile station changes over to communicating on the traffic channel reserved from the first base station. To ensure an uninterrupted group call, a 'follow me' function is activated for the group call. In response to activating the 'follow me' function for the group call and reservation of a traffic channel by the first base station for the group call, a traffic channel is reserved from each of the desired second base station adjacent to the first base station for the group call. When some of the mobile stations participating in the group call change over to using a second base station adjacent to the first base station, the mobile station changes over to communicating on the traffic channel reserved from the base station for the group call.

11 Claims, 3 Drawing Sheets

MAINTAINING A GROUP CALL IN A MOBILE COMMUNICATIONS SYSTEM

This application is the national phase of international application PCT/FI95/00710 filed Dec. 27, 1995 which designated the U.S.

FIELD OF THE INVENTION

The present invention relates to group calls in mobile communications systems, in particular, a method for maintaining a group call in a mobile communications system comprising one or more first base stations and second base stations located around the first base station, and one or more mobile stations that are able to communicate with said base stations, the method comprising the following steps:

a) one or more mobile stations are registered to one or more first base stations, b) a traffic channel is reserved for a group call from a first base station, c) said mobile station changes over to communicating on said traffic channel reserved from said first base station, d) in response to reserving a traffic channel from the first base station for said group call, a traffic channel is reserved from each of the desired second base stations adjacent to the first base station for said group call, e) upon changing over to using a second base station adjacent to the first base station, a mobile station participating in said group call changes over to communicating on a traffic channel reserved for said call from said second base station.

BACKGROUND OF THE INVENTION

The invention is intended for use specifically in so-called trunked networks, which are typically company networks or authority networks, in which all the channels are used by one or more companies or authority organisations. The subscribers of these networks have, in addition to the numbers of their own, group numbers indicating to which communication group or subscriber group the subscriber in question belongs so that the calls addressed to subscribers of the group in question can be transmitted to subscribers of that group.

The invention is suited for use in mobile communications systems the radio path of which is either digital or analog. Digital mobile communications systems may include, for instance, systems in accordance with the TETRA system (TETRA=Trans European Trunked Radio System). Analog mobile communications systems have been disclosed, e.g., in the following publications of The Department of Trade and Industry in Britain: "MPT 1327, January 1988, Revised and reprinted November 1991, A Signalling Standard for Trunked Private Land Mobile Radio Systems, Radiocommunications Agency" and "MPT 1343, January 1988, Revised and reprinted September 1991, Performance Specification, Radiocommunications Agency".

An essential feature of the above-mentioned mobile communications systems, for instance, is the capability and the purpose to carry out a group call between several of subscribers.

A group call is a conference call in which all the participants can speak and listen to each other in turn. In a group call, the entire group is called with one call number. A single mobile station (a radio telephone, for instance), that is, a subscriber may belong to several groups that are programmed in the mobile station. The system stores a file of base stations associated with the number of each group. A group call may cover one, several or all the base stations located within the area of a radio telephone exchange or a mobile services switching center, as well as several mobile services switching centers. When a group call is being established, a traffic channel is reserved from all the base stations belonging to the group, and each of these base stations sends a group call request containing a group number and information on the reserved traffic channel. If the mobile station identifies the group number contained in the group call request, it shifts onto the traffic channel indicated by the group call request.

In prior art mobile communication systems, when mobile stations participating in an individual call or in the above-mentioned group call are moving from one cell to another particularly in a trunked mobile communication system, the mobile station must interrupt its call. This is a severe problem particularly in trunked PMR (Private Mobile radio) networks, which are often intended to be used by authorities. Authorities, especially police-officers and rescue organisations in emergency duties often need a group call that extends over the area of several cells of the mobile communication system. A possibility of an uninterrupted call must be provided for a mobile station in a situation in which the mobile station is moving from one cell to another.

Previously, e.g., in the GSM system (GSM=Global System for Mobiles) the problem has been solved by means of measuring methods. In such a case, a radio unit, for instance, measures the field strength of the transmission of a base station, and, if the field strength is too low and a mobile station finds a base station with a higher field strength, it is registered to said new base station. In that situation, however, the call may be interrupted if the exchange software of the mobile communication system has not received information on the change of the area in advance. The measurements to be carried out in this procedure demand calculation capacity and accurate cooperation of the network and the mobile stations connected to it.

In the prior art solution set out above, when a subscriber shifts from one base station to another, the problem is the fact that the speech connection may be interrupted. In order that the following location could be estimated, complicated measuring methods would be required that are able to detect how the field strengths received by the receivers of a base station and a mobile station weaken and strengthen, and when it is advantageous for a mobile station to change over to communicating with another base station, that is, when a so-called handover should be performed. In addition to measuring methods, intelligent software solutions would be necessary by means of which solutions it would be possible to predict the following location in a reliable manner in situations in which a mobile station is moving fast within the service area of the mobile communication system from the coverage area of the first base station to the coverage area of some other base station.

The principal users of PMR and trunked networks, that is, authorities, e.g., police-officers and rescue staff need mobile individual and group calls in chase situations, for instance (chase group call). In such a case, a demand made on a mobile communication system is the fact that the call should not be interrupted at any stage; Furthermore, if such a group call is established that is not interrupted when a mobile station shifts from the coverage area of one base station to the coverage area of another base station, the solution to the problem must be completely reliable as authority networks require a maximum reliability owing to chase and emergency situations.

If the above-mentioned problem were solved by using prior art methods, the reliability of the solution would be too low for authorities using the system. In addition, the exchange software would become complicated and heavy, which would contradict the basic principle of trunked and PMR networks, that is, simplicity and cost-effectiveness. Furthermore, the fact that the software would become more extensive and more complicated would also reduce the reliability of the system. It is obvious that the more complicated the program, the higher the probability of a malfunction is. Such malfunctions must be eliminated from emergency and rescue work as carefully as possible.

BRIEF DESCRIPTION OF THE INVENTION

The present invention includes a method for maintaining a group call in a mobile communications system comprising one or more first base stations and second base stations located around the first base station, and one or more mobile stations that are able to communicate with the base stations. The method includes a) one or more mobile stations registered to one or more first base stations, b) a traffic channel reserved for a group call from a first base station, c) the mobile station changes over to communicating on the traffic channel reserved from the first base station, d) in response to reserving a traffic channel from the first base station for the group call, a traffic channel is reserved from each of the desired second base stations adjacent to the first base station for the group call, and e) upon changing over to using a second base station adjacent to the first base station, a mobile station participating in the group call changes over to communicating on a traffic channel reserved for the call from the second base station.

An object of the present invention is to enable a group call that follows the mobile subscribers (MS, mobile station) from one base station (BS) to another without the speech connection being interrupted.

The object of the invention is thus to implement a group call that moves along with the mobile stations from the coverage area of one base station to that of another base station so that the speech connection continues uninterruptedly.

Another object of the invention is to solve the problems occurring in prior art solutions.

This method for maintaining a group call in a mobile communications system includes the reservation step of reservation mentioned above is carried out in response to activating a 'follow me' function for a group call.

The invention further relates to a mobile communication system comprising one or more exchanges, a first base station connected to the exchange and second base stations located around the first base station, and one or more mobile stations that are able to communicate with the base stations. The mobile communication system of the invention is characterized in that it comprises a database, which is arranged to maintain information on whether a 'follow me' function has been activated for a group call to be maintained, and reservation means known per se, responsive to activating the 'follow me' function and reserving a traffic channel from the first base station for said group call, for reserving a traffic channel from each of the desired second base stations adjacent to the first base station for said group call.

The invention is based on the idea that when the 'follow me' function has been activated for a group call either automatically based on the definition is data associated with the call, or commanded by some subscriber, a traffic channel is reserved for a group call from each of the base stations adjacent to the base station to which the mobile station is registered. The reservation is carried out both when the group call is being established and when a mobile station participating in the group call is moving from the coverage area of the first base station to the coverage area of the second base station, and registers itself to the second base station.

An advantage of a method of this kind for maintaining a group call in a mobile communication system and of the mobile communication system is the fact that the solution in accordance with the invention eliminates the problems related to prior art.

Another advantage of the system is the fact that the solution of the invention is simple and easy to implement in terms of software. Implementation of the invention does not require any new measuring methods, but present methods for subscriber registration are employed.

BRIEF DESCRIPTION OF THE DRAWINGS

In the following, the invention will be described in more detail with reference to the attached drawings, in which FIGS. 1, 2, 3 and 4 schematically show operation of the method and the system of the invention when the group call area is expanding in accordance with the invention to base stations located around the location area of the mobile station.

PREFERRED EMBODIMENTS OF THE INVENTION

Figure 1:
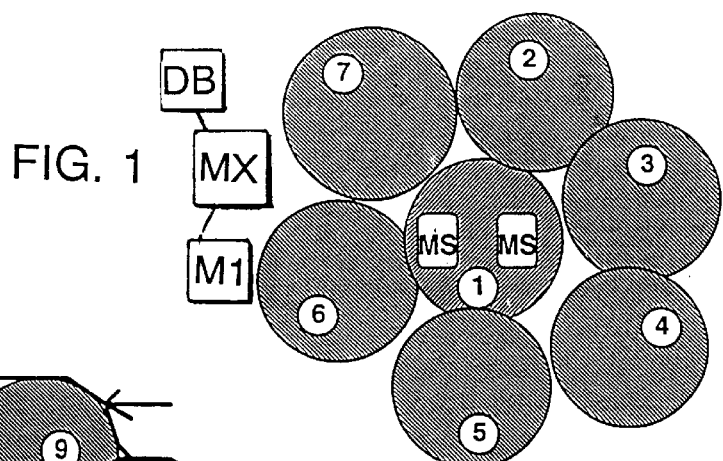

FIG. 1 shows a schematic picture of the operation of the method and the system of the invention in a situation where the group call area is expanding in accordance with the invention to base stations around the location area of the mobile station. The figure shows radio subscribers, that is mobile stations MS, base stations BS 1–7 of the mobile communication system, as well as an exchange MX of the mobile communication system connected by means of data communication links to said base stations, other exchanges, and other mobile communication systems, such as a public switched telephone network and a public land mobile network. It is also possible that the functions have been distributed in the mobile communication system by placing them at the base stations. Base stations communicate with mobile stations on control channels CC, on which traffic channels TC are allocated to mobile stations. When a mobile station or a number of mobile stations wish a group call to follow them uninterruptedly from one base station to another, the mobile station will communicate it to the mobile communication system, e.g., to its exchange along the radio path with a specific 'follow me' message. Several mobile stations that have also activated the 'follow me' function may participate in the same group call. In the mobile network, there may also be such group numbers that move along with the subscriber. In such a case, the subscriber does not have to communicate the desired 'follow me' function separately, but the call will follow him automatically. It is also possible that some other subscriber than a mobile station, e.g., a fixed subscriber or a fixed control point CP or a dispatcher, activates the 'follow me' function for a group call regarding a certain subscriber and/or a certain call.

It must be noted that a mobile station participating in a call may activate or deactivate the 'follow me', function already prior to call establishment, whereby the information on activating or deactivating is recorded in the data base of the mobile communication system. Thus, the information on activating/deactivating is available in future group calls of the mobile station in question, as well.

Figure 2:
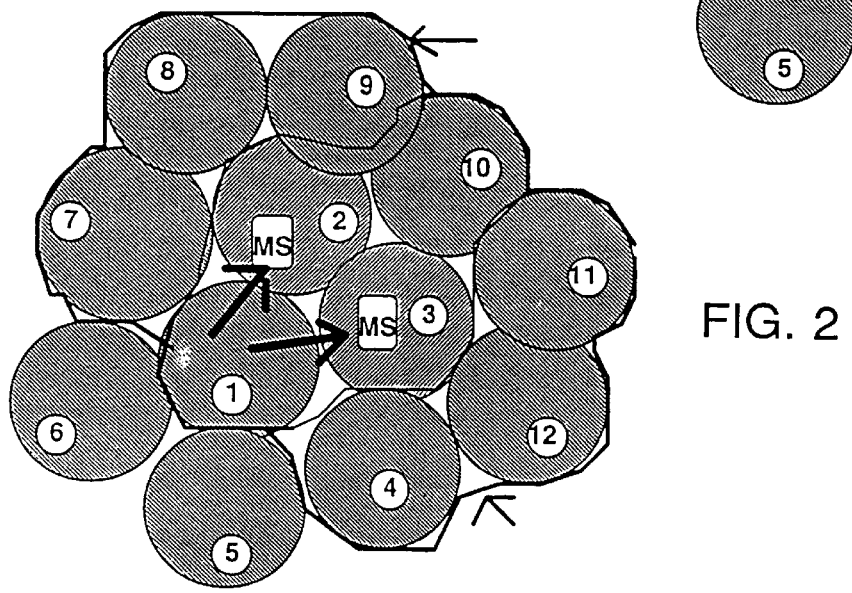
Figure 3:
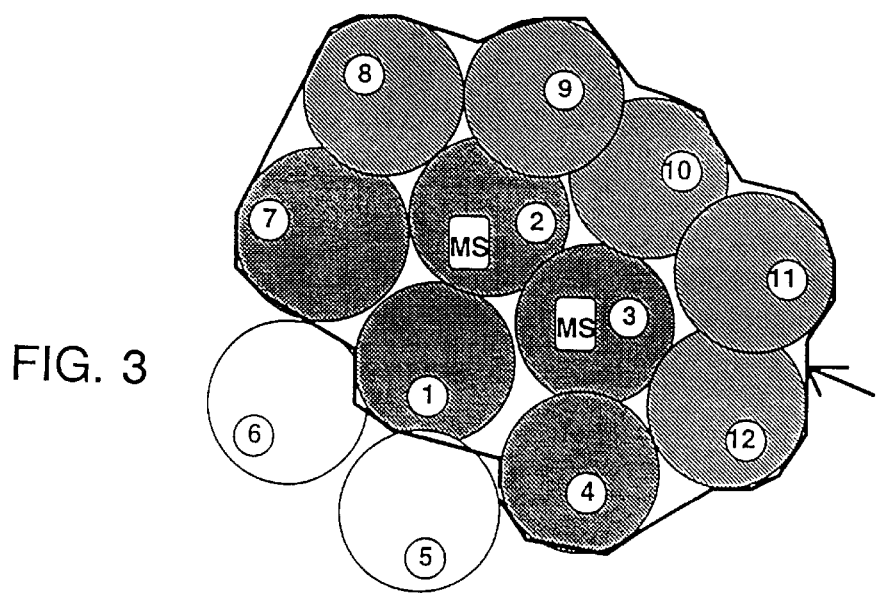

When a subscriber begins a group call or participates in a group call and activates the 'follow me' function, a traffic channel is reserved, provided that a traffic channel has not been reserved previously, from a base station 1 to which a subscriber MS is registered, and in addition, traffic channels are reserved from adjacent base stations 2–7 for the said group call. It must be noted that several mobile stations may participate in the group call, which mobile stations are located within the service areas of several base stations. Thus, when a mobile station MS participating in the group call changes over to using some of the second base stations 2, 3 adjacent to some of the first base stations 1, the mobile station MS changes over to communicating on a traffic channel reserved from the second base station 2, 3 for the group call. FIG. 2 shows a situation in closer detail in which mobile stations MS are registered to adjacent, that is, "new" base stations. In FIG. 2, subscribers MS are registered to some of these adjacent base stations 2–7, herein to base stations 2 and 3. In this case, a traffic channel has been reserved in advance for the mobile stations from the new base stations 2, 3 onto which traffic channel they are commanded. In accordance with a second embodiment of the invention disclosed hereinafter, the mobile stations to which the traffic channels to be used in adjacent base stations have been communicated, change over to using those traffic channels. Immediately after a new registration, traffic channels are reserved from base stations 1, 4, 7–12 located around the new location base station 2, 3 of both mobile stations. FIG. 3 shows these base stations with a darker color. Part of the base stations, that is, 1, 4, 7 may have been reserved already in connection with the previous reservation. Once the new traffic channels have been reserved, a comparison is made by means of software for canceling unnecessary reservations.

The reservations to be canceled are obtained e.g., by checking which ones of the old base stations do not belong to the new group of reserved base stations.

In the following, the previous example will be studied again, in which example two mobile subscribers have activated the 'follow me' function in a group call in the area of base station 1. The traffic channels are reserved from base stations 1, 2, 3, 4, 5, 6, and 7.

FIG. 2 shows a situation in which the subscribers have moved to base stations 2 and 3. In this case, traffic channels are reserved from the base stations adjacent to base stations 2 and 3, whereby a new group of base stations is obtained consisting of base stations 1, 2, 3, 4, 7, 8, 9, 10, 11, and 12.

Thereafter it is checked by means of software which base stations from the old group do not belong to the new one, and 5 and 6 are obtained as a result. Traffic channel reservations are canceled from base stations 5 and 6.

FIG. 3 shows with a darker color the base stations 1, 2, 3, 4, 7, 8, 9, 10, 11, and 12 from which traffic channels have been reserved.

It must be noted that the number of the subscribers in a group call is not limited and that a group call may be established within the coverage areas of several-base stations although the areas would not intersect. The software of the mobile communication network handles the geographical management of the group call.

Figure 4:
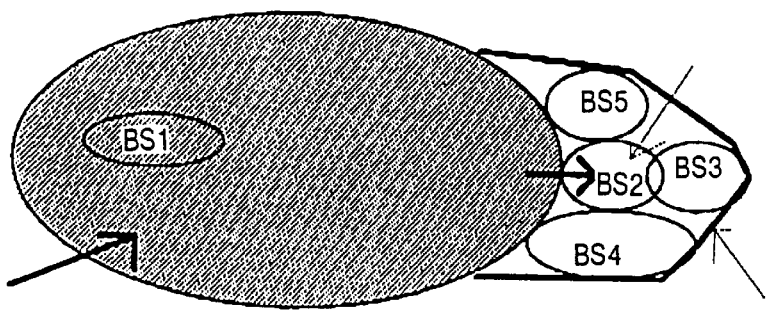

FIG. 4 shows a schematic picture of a situation in which traffic channels have first been reserved for a group call within the area of a first base station BS1 and in the area some other base stations, as well as in the area of the base stations adjacent to said base stations. This area is marked with grey in the figure. When a mobile station for which the 'follow me' function has been activated shifts into the coverage area of a second base station BS2 and is registered to the second base station, traffic channels are automatically reserved for said group call from base stations BS3–BS5 adjacent to the second base station BS2, as well.

Figure 5:
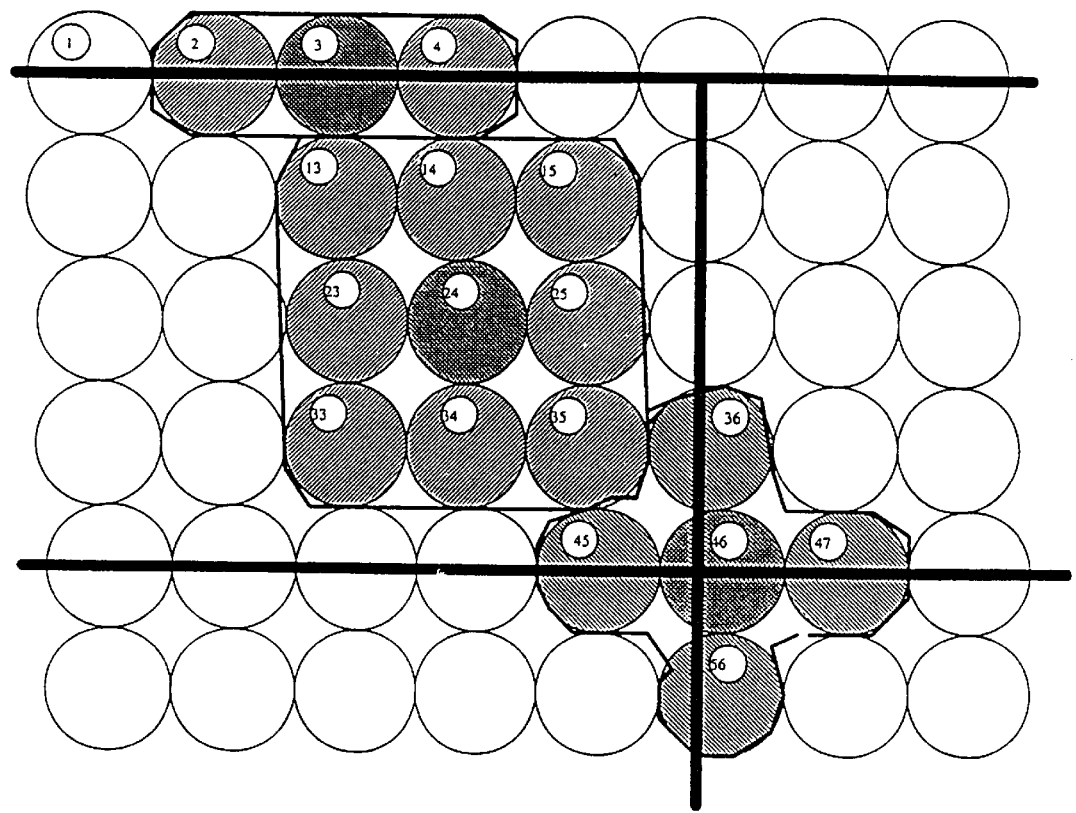
FIG. 5 schematically shows operation of the method and the system of the invention when the group call area is expanding to the desired adjacent base stations only that are advantageously located in the estimated direction of travel of the mobile station.

FIG. 5 shows a schematic picture of the operation of the method and the system of the invention in a case where a group call is expanding to the desired adjacent base stations only which are advantageously located in the estimated direction of travel of the mobile station. In this embodiment, in order that the number of the traffic channels to be reserved would not become too large, it is possible to survey and plan in advance such adjacent base stations whose geographic location is advantageous for reserving traffic channels from them for said group call. This plan can be made, e.g., by estimating an alignment in accordance with some main road.

The above method is useful in such a case, for instance, in which an ambulance on emergency duty makes a call in which a telephone located in a hospital is participating. In such a case, it is possible to estimate the routes that are used for going to the hospital, and to reserve traffic channels in advance from base stations along that route for said group call.

It would also be possible to apply a group call to the requirements of the police authorities if a momentary interruption of the group call were allowed in a case where the movement deviates from the predicted direction of travel. In that case, the principle for reserving traffic channels in accordance with the first embodiment of the invention would be applied, that is, traffic channels would be reserved from the location base station and adjacent base stations.

In practice, the invention can be implemented, e.g., so that the mobile exchange MX, FIG. 1, contains information on the adjacent base stations related to every base station.

The invention thus implements a mobile communication system comprising one or more mobile exchanges MX, FIG. 1, a first base station 1 connected to said exchange MX, and second base stations 2–7 located around the first base station 1, and one or more mobile stations MS that are able to communicate with said base stations 1–7.

The mobile communication system of the invention comprises a database DB, which is arranged to maintain information on whether the 'follow me' function has been activated for the group call maintained.

The mobile communication system of the invention further comprises reservation means M1 responsive to activating the 'follow me' function, and reserving the traffic channel from the first base station for the group call, for reserving a traffic channel from each of the desired second base stations adjacent to the first base station 1 for the group call.

In the mobile communication system of the invention, said reservation means M1 are arranged to reserve, in response to activating the 'follow me' function for the group call and registering said mobile station to the second base station, a traffic channel from each of the desired third base stations adjacent to the second base station for the group call, provided that no traffic channel has previously been reserved for the group call from the third base station, and to release the traffic channels that have been reserved in the desired second base stations for the group call, which base stations are not included in the desired third base stations adjacent to the second base station, provided that no other mobile station participating in the group call is registered to the second base station, or a base station adjacent to it.

It must be noted that this database and the reservation means are placed at the mobile exchange MX in the figure, but it is obvious that they can also be implemented elsewhere in the mobile communication network.

Figure 6:
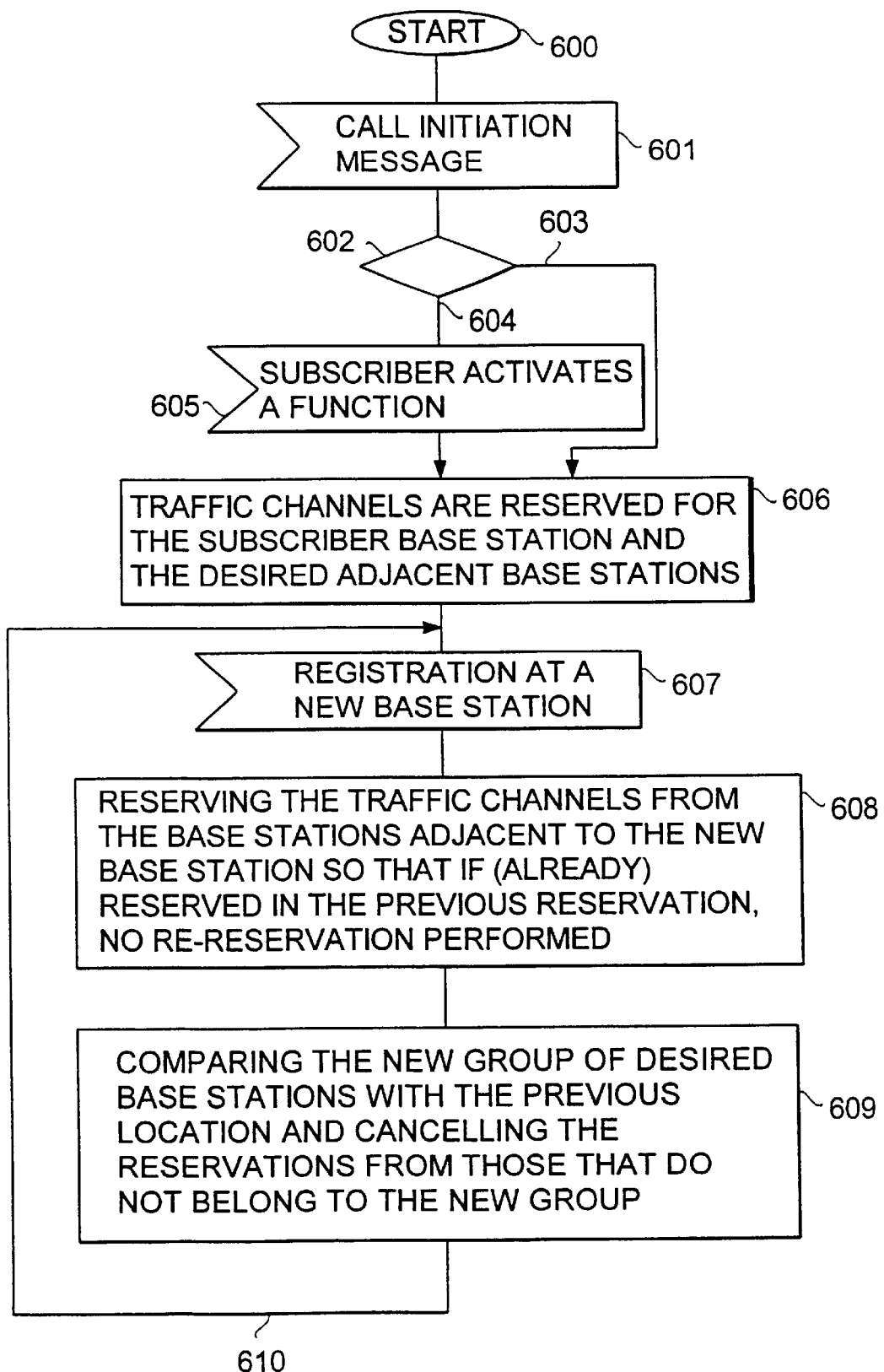
FIG. 6 is a flow chart of the operation of the method of the invention.

FIG. 6 shows a flow diagram of the operation of the method of the invention. The operation of the method starts from step 600. Then, a group call initiating message 601 follows, said message being sent to a mobile exchange MX by an element starting the group call, such as a mobile station, a fixed control point, or a subscriber of the fixed network. Thereafter, a decision block 602 follows, in which block the subscriber number of the group call to be established is analysed. If the group call is of such a type in which the 'follow me' function has not been activated 604, step 605 will follow. If, again, it is a question of a group call for which the 'follow me' function is to be activated 603 for the group call, the- process of the method continues to step 606. Otherwise, subsequent to steps 602 and 604, the process continues to step 605, in which it is checked whether some element will activate the 'follow me', function for the group call. An element of this kind could be a mobile station participating in the group call, a fixed control point, or a subscriber of the fixed network. If some of the abovementioned elements activates the 'follow me', function, the process of the method shifts to step 606, in which traffic channels are reserved for the group call in question from the base station to which the mobile stations participating in the group call are registered, and also from the desired base stations adjacent to said base station.

Furthermore, if a mobile station participating in the group call is registered to a new base station 607, traffic channels will be reserved 608 for that group call from the base stations adjacent to the new base station provided that they have not been reserved during the previous reservation step. Thereafter, in step 609, the new group of the desired base stations from which a traffic channel has been reserved for the use of said group call is compared with the group of base stations that have been reserved previously, and the channel reservation is cancelled from such base stations in which a traffic channel is no longer needed for said group call. Thereafter, the process of the method returns 610 to wait for a new registration of the mobile station to a new base station 607.

In a second embodiment of the invention, the mobile communication system communicates to the mobile station, within the area of the first base station, the traffic channels that are reserved for the group call in the desired second base stations 2–7 adjacent to the first base station 1. Thereafter, based on the basis of that information, the mobile station changes over to communicating on some of the traffic channels of the adjacent base stations 2–7. That changeover of the MS onto the traffic channel of the second base station 2–7 takes place so that the mobile station is registered to the second base station 2–7 on the traffic channel of the base station. This is possible as the mobile station has been indicated already in the coverage area of the first base station which traffic channel to use in the coverage area of the second base station.

When the 'follow me' function is wished to be canceled, a request is sent to the mobile communication system to deactivate the group call regarding a certain mobile station or all the mobile stations. In response to this request, those traffic channels are released that have been reserved for the group call at the base stations adjacent to the base station to which said mobile station MS is registered, provided that none of the mobile stations MS participating in the group call is registered to said base station 5, 6 or base station 1, 4, 7, to which said base station 5, 6 is a desired adjacent base station.

Further, if the channels of that base station are also wished to be released to which base station the mobile station is registered, a request is sent to the mobile communication system to terminate said group call regarding the mobile station MS. In response to this request, those traffic channels are released that have been reserved for the group call at the base station to which said mobile station MS is registered, as well as at the base stations adjacent to said base station, provided that none of the mobile stations MS participating in the group call is registered to the base station 5, 6 or base station 1, 4, 7, to which the base station 5, 6 is an adjacent base station. The same happens if a mobile station whose participation. in the group call is significant stops participating in the call.

The drawings and the explanations associated therewith are only intended to illustrate the idea of the invention. The method of the invention for maintaining a group call in a mobile communication system and the mobile communication system may vary in its details within the scope of the attached claims. Although the invention has been explained mainly in connection with PMR mobile radio systems, the invention may also be applied in mobile communication systems of other kinds.

What is claimed is:

1. A method for maintaining a group call in a mobile communications system in which in said group call a plurality of mobile stations communicate with each other, said mobile communications system including one or more first base stations and second base stations located around the first base stations, and one or more mobile stations that are able to communicate with said base stations in said group call and a database, said method comprising:

a) registering said one or more mobile stations in said mobile communications system;

b) activating into said database of said mobile communications system a follow me function for said group call in order for said group call to follow uninterruptedly said mobile station participating in said group call from a first base station to said second base station;

c) reserving a traffic channel for said group call from said first base station;

d) said mobile station changing over to communicating on said traffic channel reserved from said first base station;

e) in response to reserving said traffic channel from said first base station for said group call and in response to said activation of said follow me function, reserving a traffic channel simultaneously from a plurality of desired second base stations adjacent to said first base station for said group call;

f) upon changing over to using a second base station adjacent to said first base station, the mobile station participating in said group call changing over to communicating on the traffic channel reserved for said call from said second base station;

g) checking, in response to activating said follow me function for said group call, and registering of said mobile station to said second base station, whether a traffic channel has been reserved previously for said group call from all of said desired third base stations adjacent to said second base station;

h) reserving a traffic channel for said group call from said desired third base stations adjacent to said second base station from which no traffic channel has been reserved previously for said group call;

i) checking among all said desired second base stations which base stations are not included in said desired third base stations adjacent to said second base station whether a mobile station participating in said group call is registered to said base station, or such a base station to which said base station is a desired adjacent base station; and j) canceling said reservation of a traffic channel for said group call regarding said desired second base stations which are not included in said desired third base stations adjacent to said second base station, and to which base stations or base station to which said base station is a desired adjacent base station, none of the mobile stations participating in said group call is registered.

2. The method as claimed in claim 1, wherein said follow me function is activated so that a subscriber sends said mobile communication system a request to activate said follow me function for said group call.

3. The method as claimed in claim 1, wherein activating said follow me function for said group call so that upon establishing said group call in response to a subscriber number of said group call to be maintained, said mobile communication system activates said follow me function.

4. The method as claimed in claim 3, wherein said mobile communication system activating said follow me function for said group call after detecting from said database that said follow me function has been defined for said subscriber number.

5. The method as claimed in claim 1, wherein said mobile communication system communicating to the mobile station within an area of said first base station, said traffic channels that are reserved for said group call in the desired second base stations adjacent to said first base station, and wherein the mobile station changing over to communicating on some of said traffic channels of said adjacent second base stations.

6. The method as claimed in claim 5, wherein said changeover of the mobile station to communicating on said traffic channel of said second base station being performed so that the mobile station is registered to said second base station on said traffic channel of said second base station.

7. The method as claimed in claim 1, wherein said desired second base stations and said desired third base stations are defined in said database of said mobile communication system so that regarding each base station, the desired base stations adjacent to the base station in question are shown to relate to that base station.

8. The method as claimed in claim 1, further comprising:

sending said mobile communication system a request to deactivate said group call as far as the mobile station is concerned; and in response to said request, canceling said reservation of said traffic channels reserved for said group call at the base station adjacent to said base station to which said mobile station is registered, provided that none of the mobile stations participating in said group call is registered to said base station, or to a base station to which said base station is a desired adjacent base station.

9. The method as claimed in 1, further comprising:

sending said mobile communication system a request to terminate said group call regarding the mobile station; and in response to said request, canceling said reservation of said traffic channels reserved for said group call at the base station to which said mobile station is registered, as well as at the base stations adjacent to said base station, provided that none of the mobile stations participating in said group call is registered to said base station, or to a base station to which said base station is a desired adjacent base station.

10. The method as claimed in 1 wherein in case of a mobile station other than one participating in said group call communicating on said traffic channel reserved for said group call of said second base station when a mobile station participating in said group call needs said channel for operation, said mobile communication system commanding the other mobile station participating in another call to leave said traffic channel.

11. A mobile communication system including one or more first base stations and second base stations located around the first base station, and one or more mobile stations able to communicate with said base stations, comprising:

a database arranged to maintain information on whether a follow me function has been activated for a group call to be maintained, wherein in said group call, a plurality of mobile stations communicate with each other, in order for said group call to follow uninterrupted, said mobile station participating in said group call from one said first base station to said second base stations; and a reservation means, responsive to activating said follow me function for said group call and to reserving a traffic channel from the first base station for said group call, which reserves a traffic channel simultaneously from a plurality of desired second base stations adjacent to the first base station for said group call, wherein said reservation means being arranged, in response to activating said follow me function for said group call and to registering of said mobile station to said second base station, to reserve a traffic channel from each desired third base stations adjacent to said second base station for said group call provided that no traffic channel has previously been reserved for said group call from said third base station, and wherein said reservations means being further arranged to cancel reservation of said traffic channels reserved in said desired second base stations for said group call, which base stations are not included in the desired third base stations adjacent to said second base station, provided that none of the mobile stations participating in said group call is registered to said base station, or to a base station to which said base station is a desired adjacent base station.

* * * * *